Nov. 9, 1926.

R. C. COLLEY 1,606,613

COTTON CHOPPER

Filed Feb. 24, 1925   3 Sheets-Sheet 3

R. C. Colley Inventor

By Jesse R. Stone
His Attorney

Patented Nov. 9, 1926.

1,606,613

UNITED STATES PATENT OFFICE.

REGINALD C. COLLEY, OF PALESTINE, TEXAS.

COTTON CHOPPER.

Application filed February 24, 1925. Serial No. 11,224.

My invention relates to mechanically operated devices for chopping cotton.

It is customary, in the raising of cotton, to plant the seeds closer together than it is advisable for the plants to grow and, when the plants have sprouted well above the ground, to thin the plants out so that they will be properly spaced apart. The ground is bedded up in rows before planting and a mechanical planter sows the cotton seed along the crest of the bed. Owing to the manner in which the seed adhere to each other, they cannot be properly distributed; with the result that the plants come up about two or three inches apart. The plants then have to be thinned out so they will be spaced the desired distance of about eight to ten inches apart.

It is an object of my invention to provide a drawn vehicle having mechanical means thereon to chop the cotton plants from the rows so as to leave the plants standing the desired distance apart.

It is desired that the chopping device be adjustable for different heights and be capable of cutting the plants at various distances apart as desired.

In carrying out these objects it is contemplated that the cutting members shall comprise revoluble blades, so mounted as to be driven accurately even on uneven or bumpy ground and will be adaptable to various speeds of operation.

Figure 1:
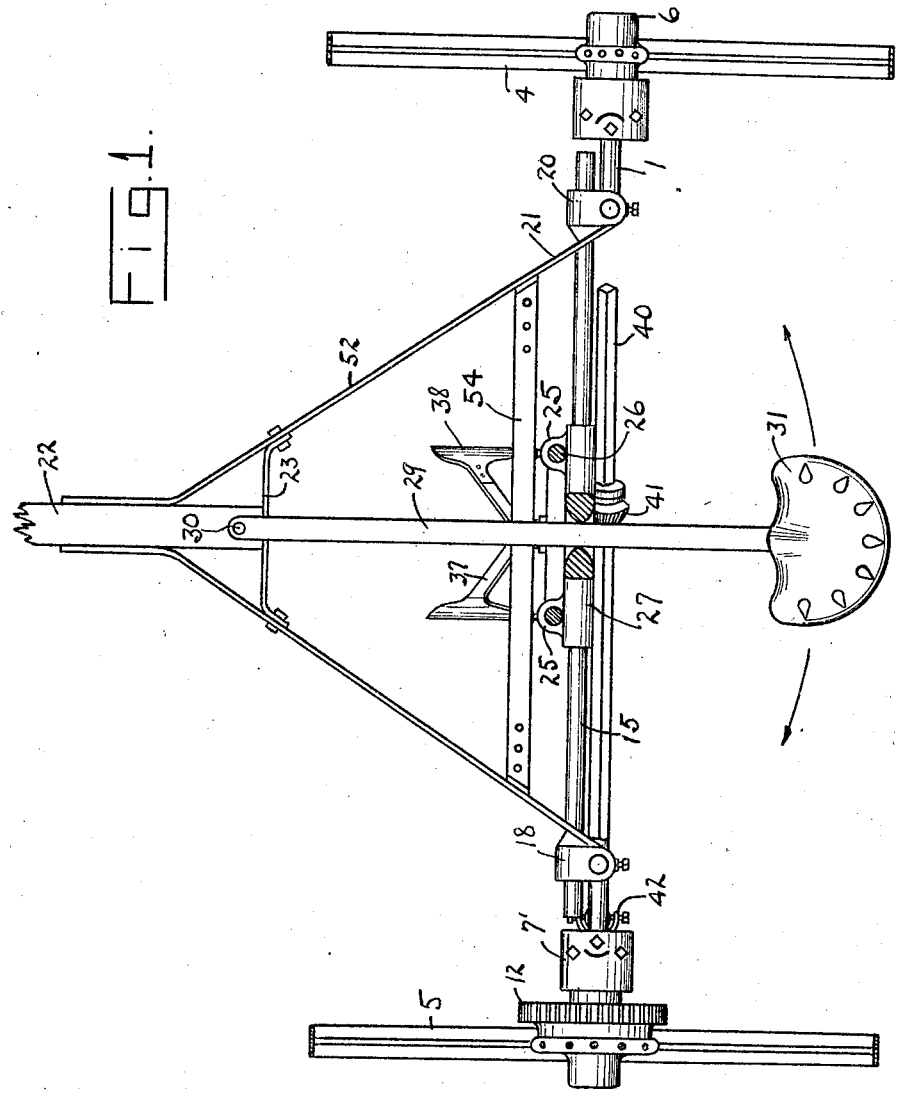
Figure 2:
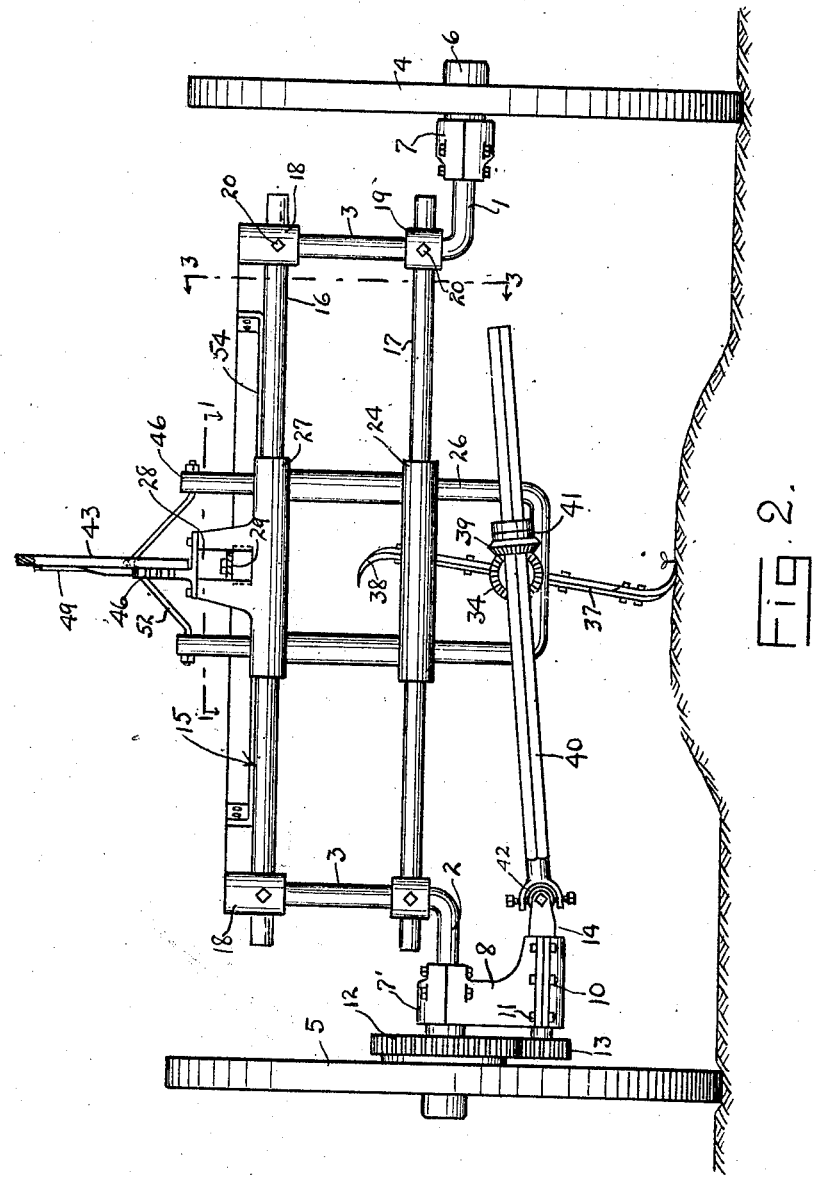
Figure 3:
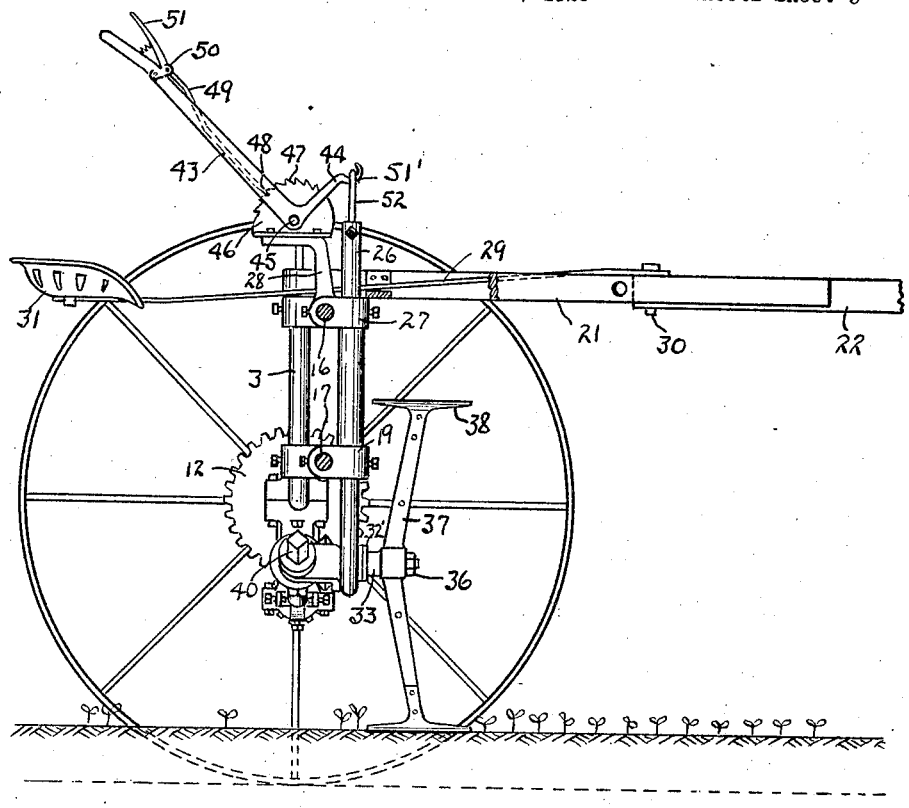
Figure 5:
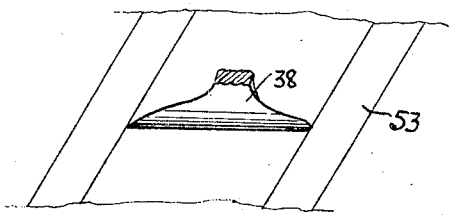
Figure 4:
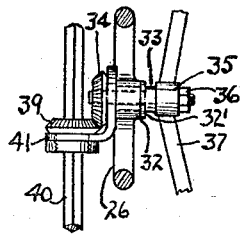

In the drawing, Fig. 1 is a top plan view of the apparatus partly in section on the plane 1—1 of Fig. 2. Fig. 2 is a rear elevation, the seat support and operating handle being in section. Fig. 3 is a side view in section on the plane 3—3 of Fig. 2. Fig. 4 is a detail of the cutter shaft drive, and Fig. 5 is a diagrammatic view illustrating the path of the cutters. Like numerals of reference are applied to like parts in all the views.

The chopping apparatus is mounted upon a wheeled vehicle having axles 1 and 2 formed with an upright extension 3 on each axle upon which the supporting frame may be mounted. The outer end of each axle is provided with wheels 4 and 5, the wheel 4 being mounted on the end of the axle in any ordinary manner. In so doing there is provided an outer cap 6, the inner end of which is clamped in position by two engaging plates 7. This is an ordinary construction not forming part of my invention.

On the wheel 5, however, the box 7' which secures the hub of the wheel in position is extended downwardly at 8 and has on the lower end thereof a bearing 9. The lower side of this bearing is formed by a removable plate 10 adapted to be clamped in position by bolts 11. On the hub of the wheel adjacent the bearing 7' is formed a gear wheel 12, this gear being rotatable with the wheel to which it is attached. This gear engages a smaller gear 13 formed upon the outer end of the shaft 14 supported by the bearing 9. In this manner the rotation of the wheel will cause a rapid rotation of the smaller gear 13 and said shaft 14.

The chopping apparatus is supported on a frame 15 slidably mounted upon the upper ends of both of the shafts 3 which form parts of the axle. The frame 15 comprises an upper cross bar 16 and lower cross bar 17 spaced apart and secured at their ends in sleeves 18 and 19 as shown in the drawing. The sleeves 18 at each end of the shaft 16 are adjustable vertically upon the shaft 3 and are adapted to be secured in position by set-screws 20. These sleeves also form a support for the rear ends of braces 21 extending diagonally forward for attachment to the tongue 22 of the vehicle. The support for the tongue is further formed by a cross brace 23 towards the forward end of the two braces 21, as shown particularly in Fig. 1.

The lower cross-bar 17 is supported at its ends in the sleeves 19, also adjustable on the shafts 3 and adapted to be secured in position by set-screws 20.

Midway of the two shafts 16 and 17 are supporting sleeves upon which the operating mechanism is secured. The bar 17 has thereon a sleeve 24, said sleeve being freely slidable along the bar 17 and having on its forward side two collars 25 to receive the legs of a U-shaped yoke 26. The upper sleeve 27 mounted on the bar 16 is of similar construction having forward collars in which the legs of the yoke 26 are slidable and having in addition thereto two upwardly extending arms 28 which form between them a support for the seat arm 29 which is mounted at its forward end at 30 on the rearward end of the tongue. This connection is a pivotal one allowing the arm 29 of the seat to be moved laterally, as indicated by the arrows, in an arc about the pivot 30. The seat 31 on the rearward end of the arm 29 may thus be moved laterally during the operation of the device so as to slide the sleeves 24 and 27, and with them the cutting elements, so as to make it possible for the operator to operate the knives directly upon the cotton row at all times.

At the lower end of the U-shaped yoke 26, and on the cross arm thereof, is a sleeve 32 forming a support for the bearing 32' of cutter shaft 33. This bearing is best shown in Fig. 4. The cutter shaft 33 is a short one, having on its rearward end a beveled gear 34, by which it is rotatable, and on its forward end is mounted a central hub 35 for the cutting blades. Said hub is mounted non-rotatably upon the shaft 33 and is retained in position thereon by the nut 36. The hub 35 of the cutter shaft may have a plurality of arms thereon and, in the drawing, I have shown two such arms 37 extending in opposite directions from the hub and also inclined slightly forward to prevent their contact with the supporting device during operation. The arms 37 are of a suitable length to contact with the ground and to bring the cutting blades 38 thereon into cutting contact with the cotton plants and such weeds or grass as may have grown in the row of the cotton. The blades thus act as hoes to chop away the plants of cotton coming within their paths. It will be noted that the blades are inclined forwardly in the direction of rotation and are thus adapted to most efficiently act in cutting away the cotton plants.

The shaft 33 upon which the cutting blades are mounted is adapted to be operated through the engagement of the gear 34 with a gear 39 upon the shaft 40. The two gears 34 and 39 are held in mesh by means of a bracket 41, one arm of which is secured to the bearing 32' and the other arm, at right angles thereto, being secured to the collar of the gear 39. The shaft 40 is a squared shaft and is secured to the shaft 14 by a universal joint connection shown at 42. It will be noted from Fig. 2 that the shaft 40 is inclined slightly upward from its connection with the shaft 14, but this inclination of the shaft may be varied according to the desired height of the cutting blades through the adjustment of the yoke 26 as will be described. The provision of the universal joint at 42 allows the free operation of the cutters at various heights in an obvious manner. It is also to be noted that the shaft 40 may automatically adjust itself at different angles to the shaft 33 of the cutters through the rotation of the bracket 41 about the shaft 33 as indicated in Fig. 4. In such case the gears 34 and 39 will be held in engagement so as to not interfere with the driving connection between the shaft 40 and the cutter shaft.

The U-shaped yoke 26 upon which the cutting apparatus is mounted may be adjusted vertically from the driver's seat through the operation of a hand lever 43, as shown best in Fig. 3. This lever has a bell crank arm 44 at its lower end and is pivoted at 45 upon a bracket 46 supported upon the arms 28 previously described. The bracket 46 has its upper edge curved in the arc of a circle and formed with ratchet teeth 47 thereon. These teeth may be engaged by a pawl 48 at the lower end of a rod 49 pivoted at 50 upon a handle and operated through a latch-lever 51 of ordinary construction. By this means, the lever arm 43 may be engaged with the bracket 46 at various angles when desired. The forward end of the arm 44 of the lever has a hook 51' thereon engaging with a rod 52, which rod is secured at its opposite ends to the upper legs of the yoke 46.

In the operation of this device, the vehicle will be drawn along the cotton row, one wheel on either side of the row, so as to bring the cutting blades directly over the row of cotton. The wheels may be spaced at a proper distance apart by adjusting the shafts 3 of the wheel axles along the framework 15 and securing the same in adjusted position by means of the set-screws 20. The U-shaped yoke which supports the cutter mechanism may be then adjusted in a vertical position, so that the blades 38 will cut the cotton row to the proper depth. In this adjustment, the vehicle will be driven along the row and the rotation of the wheel 5 will cause the rotation of the shaft 40, as previously described, thus driving the cutter shaft 33. It is contemplated that the speed of rotation of the blades 38 will be so arranged that the blades will strike the ground to chop the cotton at the proper distances apart in the cotton row.

In Fig. 5 a diagrammatic showing is made of the path of the cutter blades. As the vehicle is progressing forwardly the path of the cutter blades will be directed slightly forward in the direction of the progress of the vehicle, so that the cutter will take an inclined path. The space 53 at either end of the blade 38 indicates the part of the cotton row not touched by the blades. It is intended that this untouched space 53 will contain one or more cotton plants and that the other plants between the uncut portions of the row will be removed, together with the grass or weeds growing in the row. It is obvious that the blades may be raised out of engagement with the ground through the operation of the lever 43 in an obvious manner.

As the cotton rows are not always straight, and the path of the vehicle is not uniformly straight forward, it is necessary to move the cutting blades to one side or the other to bring them always directly over the cotton row and this adjustment is performed during the operation of the device by the driver in the seat 31. This is done by pushing the arm 29 of the seat laterally along the supporting bar 54 shown in Fig. 1. When the arm 29 of the seat is thus moved, the yoke 26 is moved therewith along the supporting frame 15 as previously described. In operating the device the driver rests his feet upon the shaft 17 and may easily shove the seat one way or the other about its pivot 30 as the vehicle is moving along the row.

The advantages of this device lie in its simplicity and convenience of operation. By the use of such a construction the labor of several men may be dispensed with, it being possible to chop the cotton from the rows in a much quicker and less laborious manner than is possible under the present hand method of chopping the cotton.

Other advantages and objects to be performed by this construction will be obvious to those skilled in the art without further description.

What I claim as new, and desire to protect by Letters Patent, is:

1. A cotton chopper comprising a vehicle frame, a supporting yoke adjustable vertically and laterally on said frame, a forwardly directed cutter shaft having a bearing in said yoke, a beveled gear on said shaft, an angular bracket on said shaft adjacent said gear, a squared drive shaft, a beveled pinion slidable thereon and supported by said bracket in engagement with said beveled gear, and means to rotate said squared shaft.

2. A cotton chopper comprising vehicle wheels, stub axles thereon, the inner ends of which are bent upwardly to form vertical extensions, parallel frame members adjustable on said extensions, means to space said axles apart on said frame members, a U-shaped yoke on said frame members, a cutter shaft having a bearing at right angles to the cross piece of said yoke, cutters on said shaft and a shaft driven from said wheels having a universal drive connection with said cutter shaft.

3. A cotton chopper comprising a vehicle frame, a supporting yoke adjustable vertically and laterally on said frame, a forwardly directed cutter shaft having a bearing on said yoke, cutters on said shaft, a beveled gear at one end of said shaft, a drive shaft, a beveled pinion slidable thereon and adapted to be rotated thereby, means supporting said pinion in engagement with said beveled gear, and means to rotate said drive shaft.

In testimony whereof I hereunto affix my signature this 13 day of February, A. D. 1925.

REGINALD C. COLLEY.